(12) United States Patent
Wang

(10) Patent No.: US 7,088,351 B2
(45) Date of Patent: Aug. 8, 2006

(54) REAL TIME IMAGE ENHANCEMENT WITH ADAPTIVE NOISE REDUCTION AND EDGE DETECTION

(75) Inventor: Shi-Chang Wang, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 483 days.

(21) Appl. No.: 10/385,087

(22) Filed: Mar. 9, 2003

(65) Prior Publication Data

US 2004/0174350 A1    Sep. 9, 2004

(51) Int. Cl.
*G09G 5/00* (2006.01)

(52) U.S. Cl. ................ 345/204; 345/667; 348/625

(58) Field of Classification Search ........ 345/204–213, 345/667, 671, 670, 393.1; 358/532, 533; 382/298–299, 300; 348/625, 561
See application file for complete search history.

(56) References Cited

U.S. PATENT DOCUMENTS

| 4,972,256 | A | * | 11/1990 | Hirosawa et al. ........... 358/532 |
| 5,142,537 | A | | 8/1992 | Kutner et al. ............... 714/747 |
| 5,467,138 | A | | 11/1995 | Gove .......................... 348/452 |
| 5,963,192 | A | * | 10/1999 | Wong et al. ................. 345/593 |
| 6,023,535 | A | * | 2/2000 | Aoki .......................... 382/299 |
| 6,295,322 | B1 | | 9/2001 | Arbeiter et al. ........ 375/240.29 |
| 6,400,852 | B1 | * | 6/2002 | Miller et al. ................. 382/298 |
| 6,526,180 | B1 | * | 2/2003 | Carley ........................ 382/268 |
| 2002/0078317 | A1 | | 6/2002 | Yasoshima .................. 711/171 |
| 2002/0080269 | A1 | | 6/2002 | Gotanda et al. ............ 348/448 |
| 2002/0145610 | A1 | | 10/2002 | Barilovits et al. .......... 345/538 |
| 2003/0011588 | A1 | | 1/2003 | Kim .......................... 345/213 |
| 2003/0043139 | A1 | * | 3/2003 | Engler ........................ 345/211 |
| 2003/0156639 | A1 | | 8/2003 | Liang .................... 375/240.01 |
| 2003/0172220 | A1 | | 9/2003 | Hao ........................... 710/305 |

* cited by examiner

*Primary Examiner*—Richard Hjerpe
*Assistant Examiner*—Abbas Abdulselam
(74) *Attorney, Agent, or Firm*—Christopher P. Maiorana, P.C.

(57) ABSTRACT

Systems and methods for controlling a display device include receiving a source video signal from a video source; storing video pixels in one or more line buffers; enhancing the video signal on the fly using data stored in the line buffers; if image enhancement is not necessary, rendering the source video signal and otherwise rendering the enhanced video signal.

20 Claims, 5 Drawing Sheets

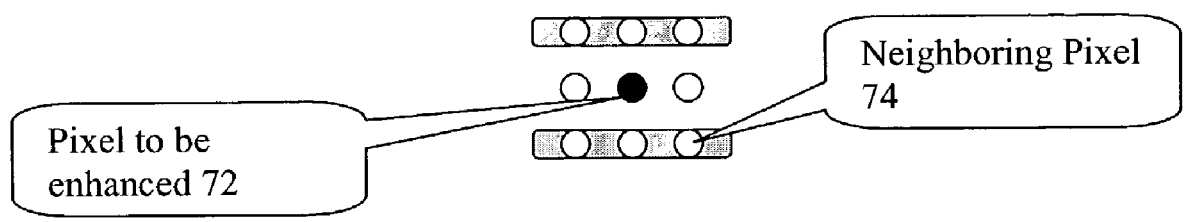
FIG. 4A
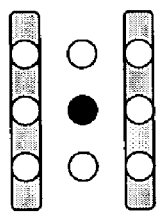   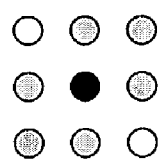   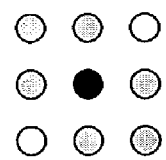
FIG. 4B         FIG. 4C         FIG. 4D

US 7,088,351 B2

REAL TIME IMAGE ENHANCEMENT WITH ADAPTIVE NOISE REDUCTION AND EDGE DETECTION

COPYRIGHT RIGHTS

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

The present invention relates to display controllers for digital display devices such as liquid crystal displays, plasma displays and progressive-scan televisions.

New digital displays such as liquid crystal display (LCD) panels are experiencing rapid adoption by consumers. In addition to being flat light-weight and thin, the digital display offers high resolution rendering of text, graphics and video information. The display is controlled by continuously feeding dot data to the display. The data is organized into individual pixels, rows of pixels, and full-page frames. A set of rows makes up a frame, which is one full page of the display. LCD data is continuously sent to the LCD panel to refresh the display frame.

Since the digital display can crisply render high resolution images, any disturbance or video artifact becomes easily visible on the display. For example, video noise typically appears as undulating twinkling bits on the display. Further, when low resolution video/graphic data is provided to the display, the input video is scaled to fit the higher display resolution, resulting in a lack of sharpness. Additionally, even if high resolution video/graphic data is provided to the display, certain display data may be devoid of fine details in the image (out-of-focus) or otherwise lack high contrast in local areas of the image. Such input with noise and/or lack of sharpness can be visually undesirable.

As mentioned in U.S. Pat. No. 4,972,256 entitled "Method of enhancing image sharpness for image reproduction using sharp/unsharp signal processing," the technique of visually enhancing sharpness of an image by amplifying density difference between contours of respective patterns in the image for use in reproducing the image with a process color scanner or the like is well known in the art. In such a conventional technique, an unsharp signal is obtained by taking the weighted average of respective image signals in a plurality of pixels arranged in the form of a matrix. A sharpness enhancement signal is generated from the unsharp signal and an image signal (sharp signal) of a central pixel of the matrix. The sharpness enhancement signal is added to an original image signal. A signal obtained by such addition is stored as an image signal expressing an image in which sharpness is enhanced.

Also, a software application such as Adobe Photoshop® allows a user to select a sharpening filter which produces a pleasing amount of sharpening for a picture. Photoshop presents a user with a control panel which can be used to set parameter values defining a sharpening filter. Once the user has selected a set of filtering parameters, the application creates the desired filter and applies the filter to the picture.

SUMMARY

Systems and methods for controlling a display device include receiving a source video signal from a video source; storing video pixels in one or more line buffers; enhancing the video signal on the fly using data stored in the line buffers; if image enhancement is not necessary, rendering the source video signal and otherwise rendering the enhanced video signal.

Advantages of the invention may include one or more of the following. Noise is reduced, and the image is sharp. The pixel value clamping is adaptive. The enhancements are done on-the-fly using a few line buffers, obviating the need for a large external frame buffer.

BRIEF DESCRIPTION OF THE DRAWINGS

FIGS. 4A–4D shows an exemplary diagram of operations on neighboring pixels in enhancing a desired pixel.

DESCRIPTION

Figure 1:
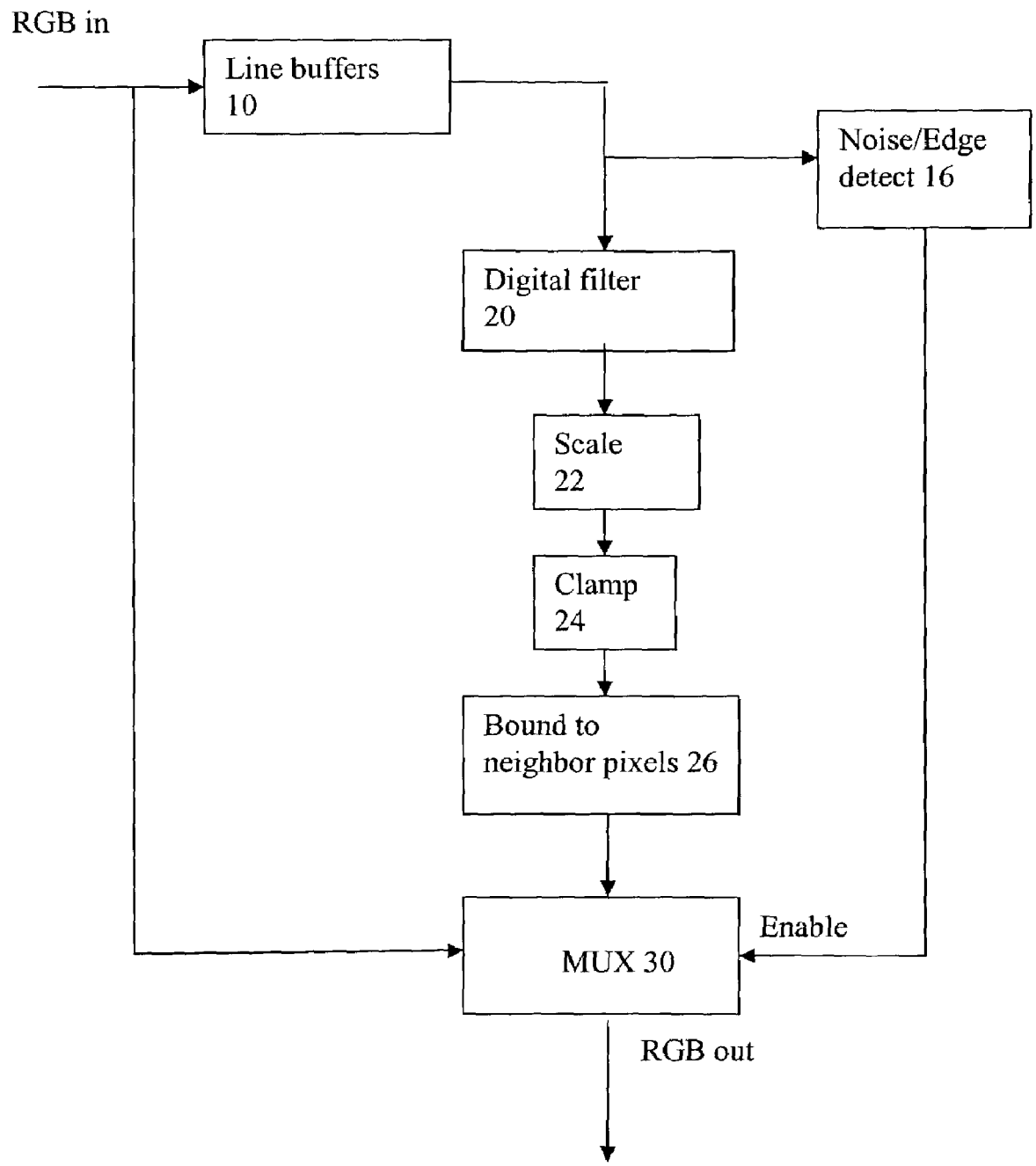
FIG. 1 shows an exemplary video enhancement system for driving a digital display device.

Referring now to the drawings in greater detail, there is illustrated therein structure diagrams for a display controller and logic flow diagrams for processes a computer system will utilize to render images on a display panel, as will be more readily understood from a study of the diagrams.

FIG. 1 shows an exemplary implementation of a system to enhance video quality on a digital display panel. The system receives a video input, such as a Red Green Blue (RGB) video signal. The video input is buffered using a plurality of video line buffers 10. The pixels stored in the video line buffers 10 are provided to a noise/edge detector 16 and a digital filter 20 to perform sharpening/unsharpening operations as well as to minimize noise artifacts. The digital filter's coefficients are programmable and different levels of enhancement can be performed. Edge enhancement effects can be adjusted during a text mode to get a clearer boundary on characters or text.

The output of the digital filter 20 is provided to a scaling unit 22, which applies a user selectable value to adjust the quality of the video output. The output of the scaling unit 22 is provided to a clamp unit 24. The pixel values are then constrained within a predetermined range by a bounding unit 26.

The output of the bounding unit 26 is provided to one input of a multiplexer 30. The video input signal is provided to the other input of the multiplexer 30. The multiplexer 30 provides one of the two inputs at its output, as controlled by an enable input. The enable input is generated by the noise/edge detector 16. The noise/edge detector 16 in turn receives input data from the line buffers 10.

In one embodiment, the edge enhancement applies 3D effects to 2D images. The system detects edges on a particular object in the video data by applying predetermined weights on eight directions: top, bottom left, right, top right, top left, bottom right, and bottom left for each pixel. Once an edge is detected as being present on a particular pixel, the pixel can be enhanced (a hit). By programming the threshold level of a hit, different levels of sharpening effects can be presented on the video.

Figure 2:
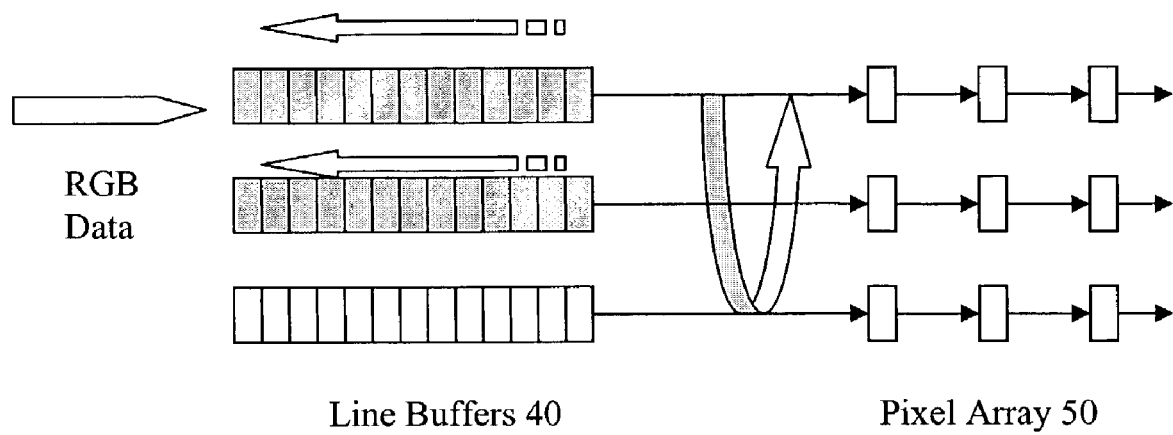
FIG. 2 shows an exemplary diagram of line buffers to store incoming video pixels.

FIG. 2 shows a plurality of line buffers for temporarily buffering pixel data during processing. In the embodiment of FIG. 2, video data such as Red Green Blue (RGB) data is sequentially stored in three line buffers 40. After the second line buffer is full, the three lines of data-corresponding to three horizontal lines on the monitor or screen stream out. From the three lines, an n×n matrix is formed, in this case a 3×3 matrix 50.

Figure 3:
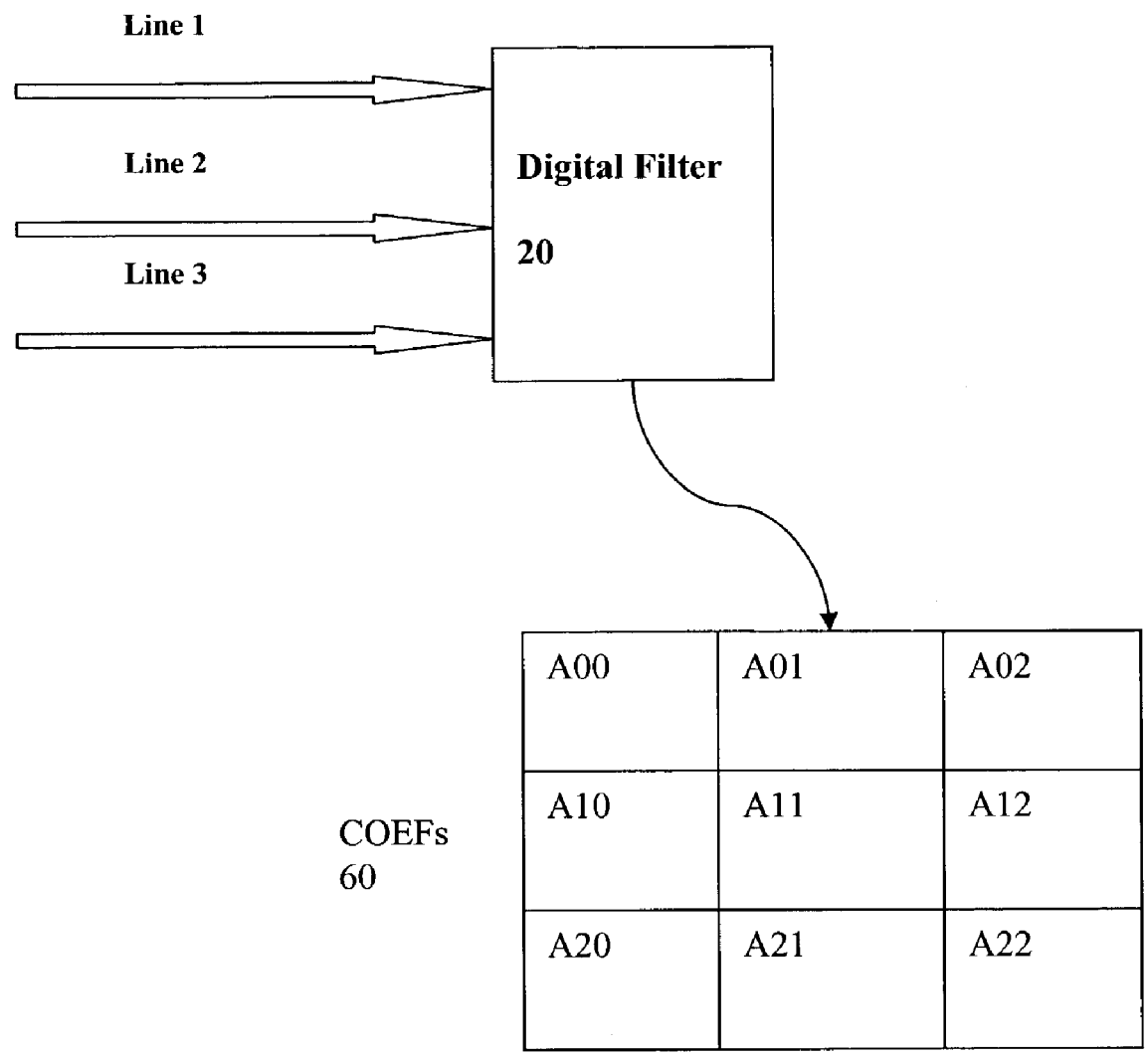
FIG. 3 shows an exemplary diagram illustrating a digital filter in FIG. 1.

The pixel to be enhanced is replaced by a value which is calculated by passing the pixels neighbored through the digital filter 20. The digital filter 20 contains a matrix of programmable coefficients 60 as shown in FIG. 3. As shown therein, three line buffers provide data to the digital filter 20. In the edge enhancement filter embodiment of FIG. 3, the filter 20 is a 3×3 matrix with coefficients a00, a01, a02; a10, a11, a12; a20, a21, and a22. The coefficient values for embodiment are as follows:

a00=−1;
a01=−2;
a02=−1;
a10=−2;
a11=12;
a12=−2;
a20=−1;
a21=−2;
a22=−1;

In another embodiment, the coefficients are:

a00=0;
a01=−2;
a02=0;
a10=−2;
a11=8;
a12=−2;
a20=0;
a21=−2;
a22=0;

Next, attenuated high frequency components are scaled and added back to the video signal to sharpen the edge. The edge detect mechanism determines which pixel needs to be enhanced. As shown in FIG. 4A–4D, the edge detection block compares four directional pairs. If one of the differences exceeds a predetermined threshold, it is considered to be a hit. A hit will then enable the edge enhancement process described above.

In FIGS. 4A–4D, sums of values for top pixels, bottom pixels, left pixels, right pixels, and diagonal pixels are determined. For example, the sum of the top pixels is arrived at by summing the contents of a00, a01 and a02. The sum of the bottom pixels is arrived at by summing the 15 contents of a20, a21 and a22. The sum of the left pixels is arrived at by summing the contents of a00, a10 and a20. The sum of the right pixels is arrived at by summing the contents of a02, a12 and a22.

The sum of the top left pixels is arrived at by summing the contents of a00, a01 and a10. The sum of the top right pixels is arrived at by summing the contents of a01, a12 and a12. The sum of the bottom left pixels is arrived at by summing the contents of a10, a20 and a21. The sum of the bottom right pixels is arrived at by summing the contents of a12, a21 and a22.

Based on the differences between the sums, the system determines whether a hit has occurred and if so, enables the multiplexer 30 to select the proper video data to be output as follows:

hit1=abs(sumtop−sumbot))>threshold hit2=abs(sumleft−sumright))>threshold hit3=abs(sumtopleft−sumbotright))>threshold hit4=abs(sumtopright−sumbotleft))>threshold if any hit occurs within a boundary, the multiplexer is enabled.

In text mode, the final data should be within a predetermined range and thus the data is clipped if the data fall outside of a boundary. In video mode, the clipping threshold for the boundary can be varied by the user (user programmable) to optimize the image quality.

In the example shown above, an edge is detected (hit3) if the abs(sumtopleft−sumbotright)>threshold. However, if a center pixel (e.g.,P11) has noise due to the sampling noise from an external sampling device such as an ADC or a video decoder, the center pixel has a value outside the range of its neighboring pixels P02 and P20. The pixel P11 is considered to be without noise when:

(P20−noise−threshold)<P11<(P02+noise_threshold) or
(P20+noise−threshold)>P11>(P02−noise_threshold)

If the center pixel P11 has a value outside the above equation, the center pixel is treated as noise. To correct the detected noise, the system uses either 1) a low-pass filter to filter the noise out, or 2) a median filter to clamp the value of pixel P11 to either pixel P20 or pixel P02. In one implementation, a switch can be used to select option 1 or option 2, depending on the noise levels from the input source.

Figure 5:
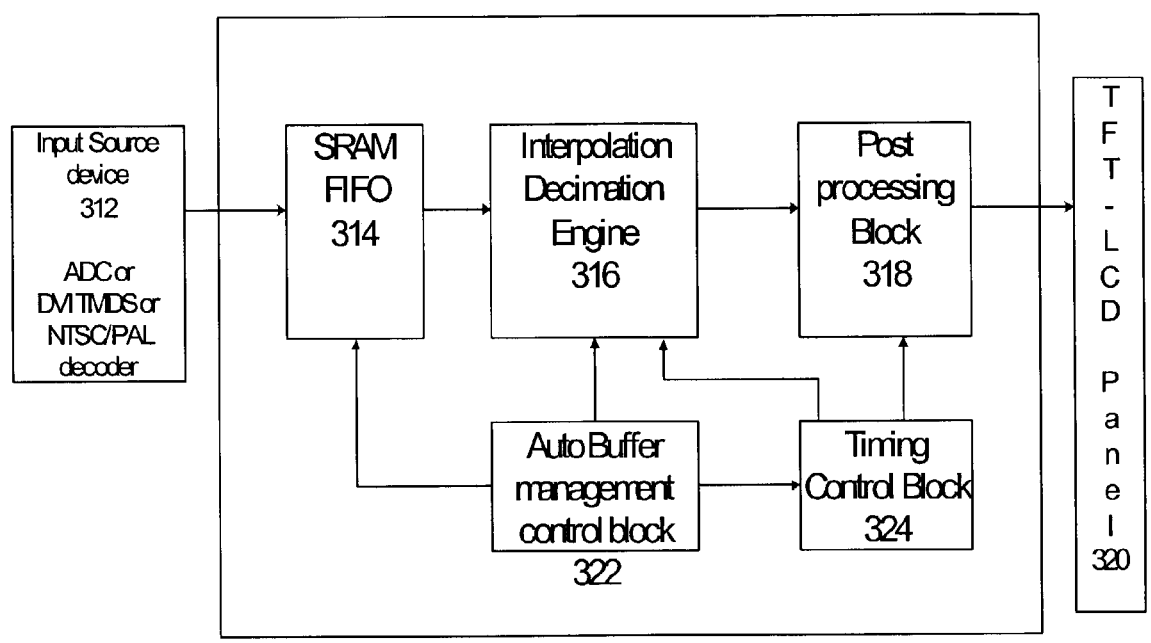
FIG. 5 shows one embodiment of a display controller.

Referring to FIG. 5, a diagram is shown illustrating one exemplary display controller 310 that displays edge enhanced and noise reduced images on various digital display devices such as liquid crystal displays, plasma displays and progressive-scan televisions, among others. The controller 310 receives input data from an input source device 112 such as an analog to digital converter (ADC), a video decoder, a computer's graphics card, a digital video interface (DVI) source, or a suitable digital video player. The incoming video data is stored in a buffer or memory 314. In one embodiment, the buffer or memory 314 is a static random access memory (SRAM). The buffer or memory 314 can be implemented as one or more single ported or double ported SRAMs with at least two outputs. The outputs can be read in parallel to process the, image data. The image data are then fed into a matrix interpolation/decimation engine 316. The interpolation decimation engine 316 reads vertical pixels in parallel, so that the horizontal and vertical pixels operation can be done in one circuitry by one matrix 2D XY filtering operation. The interpolation decimation enaine 316 has better performance than traditional horizontal, then Y direction scan line interpolation.

The interpolation decimation engine 316 provides its output to a post processing circuit or block 318, which enhances certain display characteristics. The display characteristics include, among others, the contrast (edge enhancement), the brightness, and the hue/saturation of the video to be rendered on the LCD. The output of the post processing circuit or block 318 is presented to an LCD panel 320 for display. The buffer or memory 314 and the interpolation decimation engine 316 are controlled by a buffer management control circuit or block 322. The buffer management control circuit or block 322 also controls a timing control circuit or block 324. In turn, the timing control circuit or block 324 clocks the interpolation/decimation engine 316 and the post processing circuit or block 318.

The input device 112 can be the output of an analog to digital converter (ADC) such as that from a computer video display card, a digital video input (DVI) source, or a digitized NTSUPAL decoder. The input device 112 can be any suitable digital device for generating a digital bitstream suitable for rendering such as a computer, a DVD player, a VCR, or a multimedia unit to receive program data from one or more service providers and to display the program data for viewing. Such service or content providers can include terrestrial broadcasters, cable operators, direct broadcast satellite (DBS) companies, companies providing content for download via the Internet, or any similar such content and/or service provider.

The input data is provided to the buffer or memory 314. The buffer or memory 314 compensates for the differences in speed of the incoming and the outgoing circuitry through which the data must pass. In one embodiment, the memory 314 is implemented as a high speed static random access memory (SRAM). However, the memory can be any suitable memory, including DRAM, EEPROMs, flash, and fen-o-electric elements, for example.

The system allows a display panel output clock rate to operate at a rate that is not preset with respect to an input clock rate or a frame rate. Rather, the input/output clock is automatically harmonized by snooping a fullness level of the internal memory 314 and using the output video scan line rate as a basis to adjust the line buffer usage and scan line period (video width). Unlike the prior art, the system does not need to generate the target clock signal having a frequency of exactly X/Z times the frequency of a reference clock signal. As a result, a simple PLL is used to generate the clock.

In one embodiment, the memory 314 is configured as a ring buffer First In First Out (FIFO). The FIFO allows the matching of multiple asynchronous systems where incoming video operates at a significantly different clock frequency than outgoing video. The length of the FIFO is determined by the difference in clock rates and the amount of data to be buffered. The FIFO allows simultaneous access to the memory through two independent "write" and "read" pointers. Since the data is always contiguous, an address bus is not needed and data is read out in the same order in which it was received. Additionally, the FIFO provides a high limit pointer and a low limit pointer to clamp the horizontal line changes. The high limit pointer is used to limit the addition of clocks in the horizontal line, while the low limit pointer is used to limit the reduction of clocks in the horizontal line.

Internally, two flags provide information on the status of the memory array. Flag logic prevents illogical writes and reads from occurring. The "empty" flag indicates that the read and write cycle counts are equal, and will be automatically asserted after a reset, which functions to reset the cycle counters and returns both read and write pointers to memory address zero. The empty flag, therefore, prevents reading while empty, a data underflow condition. As a result, if the memory array is empty, a read cycle is inhibited until at least one data entry has been written. On the other hand, a "full" flag indicates that the write and read counts are at a maximum distance apart, which implies that a full load of data has been written to the FIFO and has not yet been read out. The full flag, therefore, prevents writing while full, a data overflow condition. If the memory array is full, a write cycle is inhibited until at least one data entry has been read out. Once data that has been stored at a given address is read, it can then be overwritten.

To illustrate, the system controls the LCD device 320 having a scan line rate. The buffer 314 receives video from the input source device 312 and stores the incoming data. The buffer 314 has a fullness measure, namely the high limit. The system compares the fullness measure to the scan line rate and adjusts a period of the scan line to avoid buffer overflow or underflow. The adjustment is done by adding or subtracting clocks to the output video clock.

The system can perform interpolation or decimation on an image. In one embodiment, interpolation or decimation is done by considering image diagonal characteristics. The diagonal characteristic determination is done by reading multiple vertical pixels simultaneously. The system can perform two-dimensional image filtering operations on the multiple vertical pixels. Post-processing is then performed before video data is sent to the display device. Post-processing includes adjusting contrast, adjusting brightness, adjusting hue and saturation, reducing noise, performing gamma correction, or enhancing a video image.

It is to be understood that various terms employed in the description herein are interchangeable. Accordingly, the above description of the invention is illustrative and not limiting. Further modifications will be apparent to one of ordinary skill in the art in light of this disclosure.

The invention has been described in terms of specific examples which are illustrative only and are not to be construed as limiting. The invention may be implemented in digital electronic circuitry or in computer hardware, firmware, software, or in combinations of them.

Apparatus of the invention may be implemented in a computer program product tangibly embodied in a machine-readable storage device for execution by a computer processor; and method steps of the invention may be performed by a computer processor executing a program to perform functions of the invention by operating on input data and generating output. Suitable processors include, by way of example, both general and special purpose microprocessors. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; optical media such as CD-ROM disks; and magneto-optic devices. Any of the foregoing may be supplemented by, or incorporated in, specially-designed application-specific integrated circuits (ASICs) or suitably programmed field programmable gate arrays (FPGAs).

While the preferred forms of the invention have been shown in the drawings and described herein, the invention should not be construed as limited to the specific forms shown and described since variations of the preferred forms will be apparent to those skilled in the art. Thus the scope of the invention is defined by the following claims and their equivalents.

What is claimed is:

1. A method for controlling a display device, comprising:
    receiving a source video signal from a video source;
    storing video pixels of the source video signal in one or more line buffers;
    generating an enhanced video signal on the fly using data stored in the one or more line buffers;
    generating a control signal in response to noise/edge detection performed using the stored data in the one or more line buffers; and
    multiplexing the source video signal and the enhanced video signal in response to the control signal.

2. The method of claim 1, wherein generating the enhanced video signal comprises minimizing noise artifacts.

3. The method of claim 1, wherein generating the enhanced video signal comprises sharpening or unsharpening the source video signal.

4. The method of claim 1, wherein generating the enhanced video signal comprises digitally filtering the source video signal.

5. The method of claim 1, further comprising reading multiple vertical pixels simultaneously.

6. The method of claim 1, wherein the noise/edge detection comprises detecting an edge using multiple vertical pixels.

7. The method of claim 6, wherein the edge on an object in a picture is detected by applying predetermined weights on a plurality of directions.

8. The method of claim 7, wherein the directions are selected from the group consisting of top, bottom, left, right, top right, top left, bottom right, and bottom left.

9. The method of claim 1, further comprising post-processing on video data going to the display device.

10. The method of claim 9, wherein said post-processing comprises adjusting contrast, adjusting brightness, adjusting hue and saturation, reducing noise, performing gamma correction, or enhancing a video image.

11. A system for controlling a display device, comprising:
means for receiving a source video signal from a video source;
means for storing video pixels in one or more line buffers;
means for generating an enhance video signal on the fly using data stored in the one or more line buffers;
means for generating a control signal in response to noise/edge detection performed using the stored data in the one or more line buffers; and means for multiplexing the source video signal and the enhanced video signal in response to the control signal.

12. The system of claim 11, wherein generating the enhanced video signal comprises minimizing noise artifacts.

13. The system of claim 11, wherein generating the enhanced video signal comprises sharpening or unsharpening the video signal.

14. A liquid crystal display (LCD) controller, comprising:
a buffer to receive image data, the buffer having a fullness measure;
a buffer controller coupled to the buffer to snoop the fullness of the buffer, compare the fullness to an LCD horizontal sync (HSYNC) signal, and adjust the HSYNC period to avoid buffer overflow or underflow; and
a circuit coupled to the controller to minimize noise and to sharpen the image data.

15. The LCD controller of claim 14, wherein circuit is configured to digitally filter the image data.

16. The LCD controller of claim 14, wherein the circuit is configured to read multiple vertical pixels simultaneously.

17. The LCD controller of claim 14, wherein the circuit is configured to detect an edge from multiple vertical pixels.

18. The LCD controller of claim 17, wherein the circuit is further configured to detect the edge on an object in a picture by applying predetermined weights on a plurality of directions.

19. The LCD controller of claim 18, wherein the predetermined weights are applied to directions selected from the group consisting of top, bottom, left, right, top right, top left, bottom right, and bottom left for each pixel.

20. The LCD controller of claim 14, further comprising a post-processing block configured to present video data to the display device.

* * * * *